PULSE MODULATED CARRIER RECEIVER SYSTEM

Original Filed Oct. 28, 1944 2 Sheets-Sheet 1

INVENTORS
EMILE LABIN
DONALD D. GRIEG
BY Percy P. Lantzy
ATTORNEY

INVENTORS
EMILE LABIN
DONALD D. GRIEG
BY Percy P. Lantzy
ATTORNEY

Patented Aug. 28, 1951 2,565,504

UNITED STATES PATENT OFFICE 2,565,504

PULSE MODULATED CARRIER RECEIVER SYSTEM

Emile Labin, New York, N. Y., and Donald D. Grieg, North Caldwell, N. J., assignors to Federal Telephone and Radio Corporation, New York, N. Y., a corporation of Delaware Original application October 28, 1944, Serial No. 560,768. Divided and this application February 4, 1950, Serial No. 142,488

7 Claims. (Cl. 250—20)

This invention relates to a pulse modulated carrier receiver system.

This is a divisional application derived from our copending application, Serial No. 560,768 filed October 28, 1944 entitled "Frequency Carrier Systems," now forfeited.

An object of the invention is to provide an improved receiver or demodulator system for pulse time modulated carriers.

In certain pulse time modulation carrier systems a component of the carrier is selected according to one feature of our invention and is used as a means for supplying a demodulating wave for the pulse displacement demodulator of the receivers of such systems. The original carrier frequency, is so selected at the transmitter as to have a desired harmonic relation with respect to the timing of the pulses in the absence of time displacement. Thus, the carrier component or some suitable sub-harmonic thereof, when segregated from the modulated carrier at the receiver, may be used as a time basis by which the time displacements of the pulses can be measured and/or translated into amplitude displacements.

One method of obtaining the carrier component includes limiting the modulated carrier between two gate limits selected in the vicinity of the zero axis of the carrier, whereby a rectangular wave is obtained. The slopes of the leading and trailing edges of such rectangular wave vary in steepness according to the signal components present in the modulated carrier. These signal components are at least in part removed by filtering the wave by means of a filter circuit tuned to the frequency of the carrier before modulation. In certain types of modulation one such processing operation may be sufficient to remove the signal components and reproduce the carrier component substantially as it existed before modulation. If one such processing is insufficient to substantially free the carrier component from the signal components, then the clipping and filtering operations may be repeated as required.

The processing of the rectangular wave may include application thereof to a multivibrator or other circuit whereby the rectangular wave is translated into a second rectangular wave in which the leading and trailing edges are of substantially the same steepness throughout the wave. Such a wave may then be applied to a filtering circuit tuned to the frequency of the carrier before modulation whereby the harmonics of the rectangular wave are removed thereby producing a substantially true sinusoidal wave of the frequency of the original carrier.

The above and other objects, features and applications of the invention will become apparent upon consideration of the following detailed description when read in connection with the accompanying drawings in which.

Figure 1:
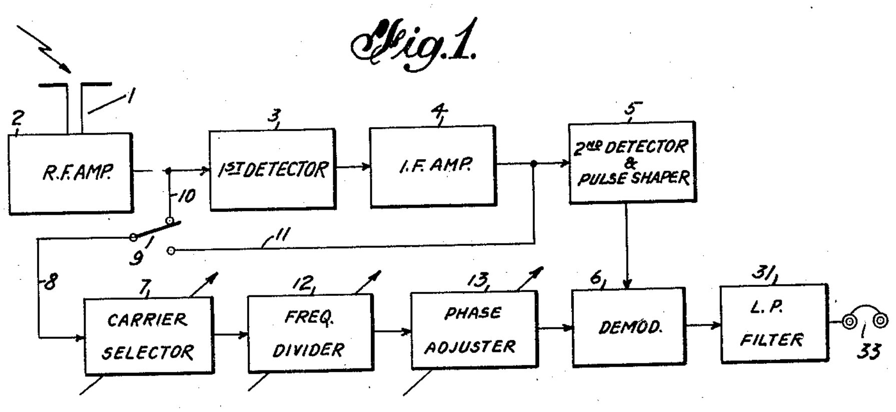
Fig. 1 is a block diagram of a pulse modulated carrier receiver system embodying the present invention.

Referring to the drawings, we will describe the frequency component selection of a pulse modulated carrier and also describe how the frequency component thus selected may be used as a demodulating wave in the receiver. It will be understood, of course, that in order to so employ the carrier component the frequency of the carrier used at the transmitter must bear a harmonic relationship with respect to the unmodulated timing of the pulses.

The receiver of Fig. 1 is shown to include an antenna 1 whereby a pulse modulated carrier is applied to the usual R. F. amplifier 2, the output of which is applied to a first detector 3 for translation of the carrier to intermediate frequency. The intermediate frequency carrier is applied to an I. F. amplifier 4, the output of which is applied to a second detector and pulse shaper 5 for removal of the I. F. carrier, the output of the detector 5 comprising narrow width, direct current pulses corresponding preferably to the leading edges of the pulse envelopes of the modulated carrier. The pulse output of detector 5 is applied to a demodulator 6 whereby the time displacements of the pulses are measured, that is, translated into amplitude displacements.

In order to effect such measurement or translation of the time displacements of the pulses it is necessary to provide a time basis such as the carrier or a sub-harmonic thereof. The carrier, however, must have a definite relationship with respect to the timing of the pulses so that the pulses, in the absence of time displacement will occur at points defining a given level on said wave. In other words, the carrier must be synchronized with the pulse transmitted. (This condition is generally automatically obtained when an oscillator is pulsed.) Thus, where the carrier has this desired relation, energy thereof may be used as the demodulating wave for the demodulator 6.

Figure 3:
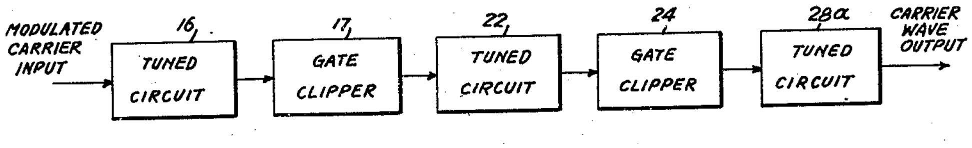
Figs. 3 and 4 are block diagrams of two embodiments of the frequency component selector.
Figure 4:
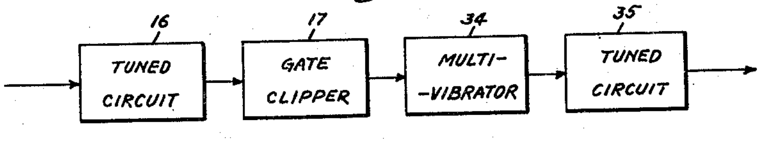

We have shown in Fig. 1 a carrier selector 7 corresponding to one or the other of the selector systems shown in Fig. 3 and 4 with an input connection 8 having a movable switch contact 9 whereby either the output connection 10 of amplifier 2 or the output connection 11 of amplifier 4 may be connected to the selector 7. The carrier selector 7 operates in the same manner regardless of which amplifier output is connected thereto, the difference being that if the R. F. amplifier 2 is connected to the selector 7, there will be provided a carrier component output for the selector 7 of a frequency corresponding to the R. F. carrier in the absence of modulation. In case the I. F. amplifier 4 is connected to the selector 7, the output frequency of selector 7 will correspond to the intermediate frequency of the amplifier in the absence of modulation. In either case, the frequency of the output wave of selector 7 may be higher than desired for the demodulator 6. In such case, the frequency may be reduced by frequency divider 12 and the resulting wave adjusted in phase at 13 before application to the demodulator 6. Carrier selector 7, and frequency divider 12 are shown as variable so that they may be selectively adjusted for response to either the received carrier or the intermediate frequency carrier.

Figure 2:
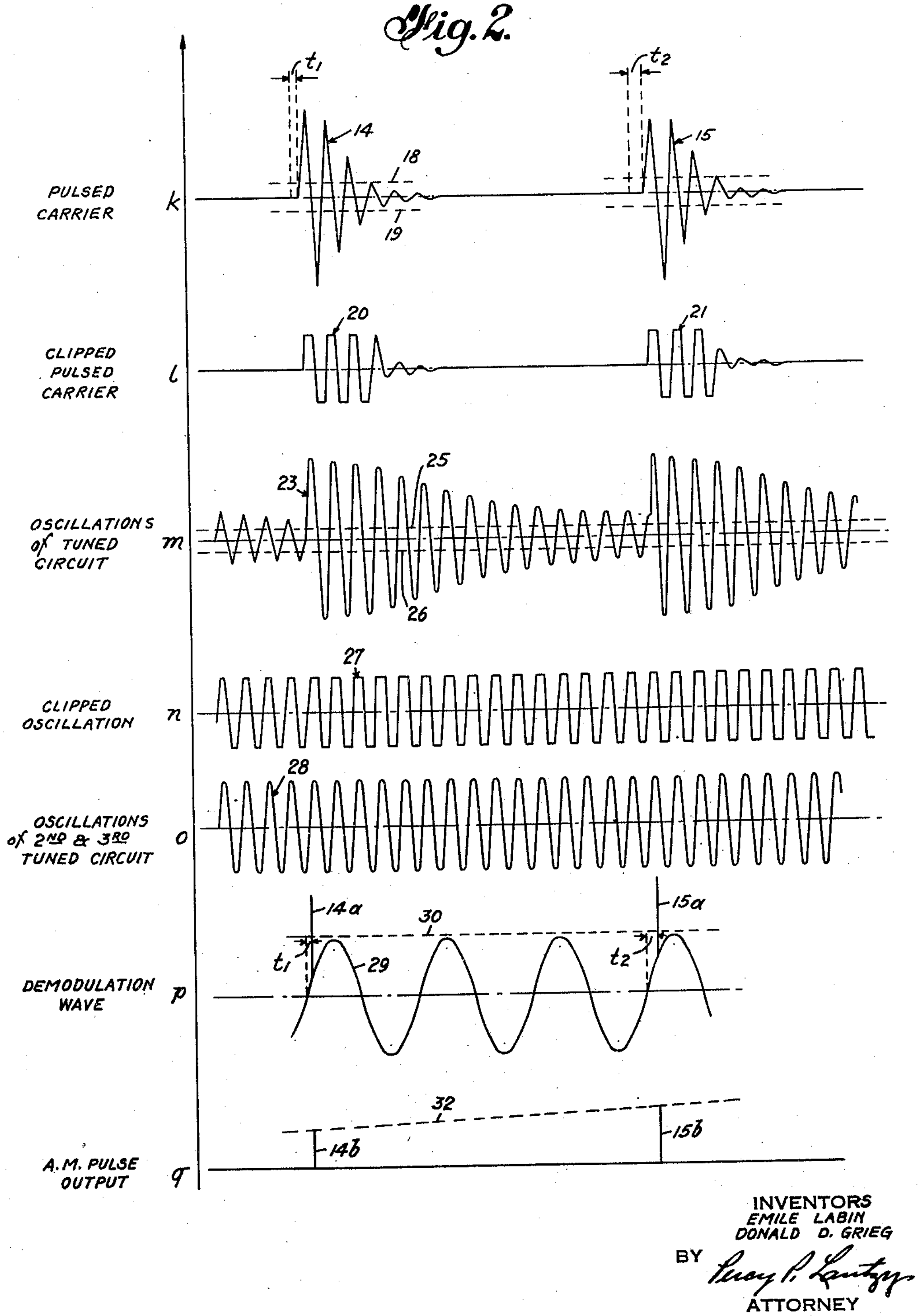
Fig. 2 is a graphical illustration helpful in explaining the operation of the receiver system of Fig. 1.

Fig. 2 has been provided to illustrate more clearly the operating steps of the system when a pulse modulated carrier is applied to the selector 7.

A pulsed carrier may be represented for purposes of illustration as shown at 14 and 15, graph *k*, although in actual practice the carrier employed is of a much higher frequency than that indicated by comparison of the carrier undulations with the pulse envelope illustrated. The leading edge of pulse 14 is shown to be time displaced an amount $t_1$ while pulse 15 is displaced an amount $t_2$. While these displacements for two succeeding pulses are shown to be in the same time direction, it will be clear that the time displacement may be in opposite directions, as in the case of push-pull time modulation. It will also be clear that certain of the pulses may be given a constant timing while other pulses are displaced in time.

The carrier selector 7 may be of any suitable type such as those illustrated in Figs. 3 and 4. Referring first to Fig. 3, the pulsed carrier, after passing through a tuned circuit 16 which is conventionally part of R. F. amplifier 2, is applied to gate clipper 17, the carrier being limited between gate limits 18 and 19 thereby resulting in rectangular waves as illustrated at 20 and 21, graph L. Limits 18 and 19 are preferably located in the vicinity of the zero axis of the wave. While the limits 18 and 19 are preferably selected on opposite sides of the zero axis, they may, in some instances, be located on the same side of the zero axis. This clipping operation results in a substantially rectangular wave wherein the leading and trailing edges are steeper for the undulations of the carrier that are of greater amplitude.

By applying the rectangular waves 20 and 21 to a second tuned circuit 6, of low "Q" characteristics and tuned to the frequency of the carrier prior to modulation, the corners of the wave and the differences in the slope of the leading and trailing edges are greatly diminished if not substantially eliminated. When the wave output of clipper 17 is applied to tuned circuit 22, it will produce an oscillation in the output of the circuit 22 such as illustrated at 23, graph *m*. While the oscillations 23 are purposely exaggerated to better illustrate the translation, it will be clear that the initial oscillations set up in the circuit by the initial undulations of the wave segments 20 and 21 will be of greater amplitude than those following. This is because the leading and trailing edges of the first undulations of the wave segments 20 and 21 are the steepest, the steepness of the leading and trailing edges of the succeeding undulations thereof decreasing according to the decay of the pulse oscillations 14 and 15. While the oscillations 23 are shown to continue throughout the interval between succeeding pulses 14 and 15 the interval may be such, and the characteristics of the tuned circuits may be of sufficiently low "Q," as to cause the oscillations to die out between pulses. In such case a repeated processing, that is, a further gate clipping and filtering operation, may be employed to obtain a continuous oscillation.

The time displacement of pulses 14, 15 due to modulation will, of course, alter the amplitude of the oscillations of wave 23 according to the degree of such time displacement. The pulse displacement, being usually well under one microsecond, will not vary the amplitude of the oscillations or the cyclic operation of the low "Q" circuit to any appreciable extent.

Assuming that the wave 23 is applied to a second gate clipper such as clipper 24 of Fig. 3 whereby it is clipped between limits 25 and 26, a rectangular wave 27, graph *n*, will be produced. The frequency of this wave is substantially constant, but here again, the leading and trailing edges vary in steepness according to the variations in amplitude of oscillations 23. By applying the wave 27 to the tuned circuit 28*a* or to a multivibrator and then a tuned circuit, the variations in steepness of the leading and trailing edges are largely overcome thereby resulting in a substantially true sinusoidal wave of the desired frequency as indicated at 28, graph *o*.

As hereinbefore stated, it may be desirable to divide the frequency of the wave 28 before application to demodulator 6. Such a sub-harmonic derived by frequency division and properly phased with relation to the normal timing of pulses 14 and 15 is shown at 29, graph *p*. The superposition of the detected pulses such as indicated at and on the wave 29 produces in the demodulator a translation of time displacement of the pulses into amplitude displacement. This is effected in an ordinary mixer circuit of known character whereby the potentials of the demodulating wave 29 and pulses 14*a* and 15*a* are mixed within a vacuum tube biased to provide a threshold clipping level 30 preferably exceeding the amplitude of the wave 29. This threshold clipping level clips the pulses 14*a* and 15*a* thereby producing a pulse output 14*b*, 15*b* which vary in amplitude according to the time displacements of the pulses of the input signal pulses. Thus, by applying the output pulses 14*b* and 15*b* to a low pass filter 31 or a peak riding clipper, the signal envelope such as indicated at 32 will result which may be applied to ear phones 33 or other signal utilization circuit. Where a peak riding clipper is employed, the mixer tube of the demodulator need not be biased to provide a threshold clipping operation.

In Fig. 4, we show a variation in processing of the rectangular waves 20 and 21 of graph L. This system includes tuned circuit 16 and gate clipper 17 as in Fig. 3. The output of clipper 17, however, is applied to a known form of multivibrator 34 whereby the variation in steepness of the leading and trailing edges of the waves 20 and 21 is substantially removed. That is to say, the undulations of the wave 20 control the multivibrator to produce a multivibrator wave. By arranging the multivibrator so that synchronization takes place near the zero axis, variations of the multivibrator periods are minimized. Thus, a wave is produced in which the leading and trailing edges of the successive undulations thereof are of the same slope, for example, they may be substantially vertical. By applying the multivibrator wave to a circuit 35 tuned to the frequency of the original carrier, the harmonics of the multivibrator wave are removed thereby producing a sinusoidal wave of the frequency of the original carrier.

While we have shown and described various embodiments and applications of the invention, it will be understood that many other embodiments, variations and applications may be made without departing from the invention. It is to be understood, therefore, that the systems herein illustrated and described are to be regarded as illustrative of the invention only and not as restricting the scope of the invention as set forth in the appended claims.

We claim:

1. A system for demodulating a pulsed time displacement modulated carrier wave in which the carrier is harmonically related to the unmodulated repetition rate of the pulses comprising means for deriving from said modulated carrier an unmodulated continuous wave of the same frequency as said carrier, means for detecting said pulsed modulated carrier to derive the pulses thereof, means for deriving from said continuous wave a demodulating wave, a demodulator, and means for applying said demodulating wave and said detected pulses to said demodulator to translate the time modulation thereof into amplitude modulation.

2. A receiver for a pulse time modulated carrier wave in which the carrier is harmonically related to the unmodulated repetition rate of the pulses comprising a radio frequency amplifier for amplifying said carrier, a first detector to translate said carrier into an intermediate frequency carrier, an intermediate frequency amplifier, a second detector to obtain pulse envelopes from said intermediate frequency carrier, a carrier component selector, means to selectively apply energy from one of said amplifiers to said carrier component selector, a demodulator, means to apply the pulse output of said second detector to said demodulator, and means to apply the carrier component output of said selector to said demodulator, whereby the time displacements of said pulses are measured with respect to the phase of said carrier component.

3. A receiver system according to claim 2 wherein the means to apply energy of said carrier component to said demodulator includes means for dividing the frequency of said carrier component to a suitable frequency for demodulating purposes.

4. A receiver system according to claim 2 wherein the means for applying energy of said carrier component to said demodulator includes means for adjusting the phase of said energy with respect to the timing of said pulses in the absence of time displacement.

5. A receiver system according to claim 2 wherein the means for applying carrier energy from one of said amplifiers includes a switch for selective connection to the outputs of the radio frequency amplifier and the intermediate frequency amplifier.

6. A method of deriving a continuous carrier frequency wave form, and demodulating, a pulsed time displacement modulated carrier to derive the signal carried by the time displacement modulated pulses, wherein the pulses in their unmodulated state have a repetition rate subharmonically related to said carrier frequency, comprising gate clipping said modulated carrier in the vicinity of its zero axis, filtering the clipped output to produce a continuous wave of uneven amplitude, gate clipping said continuous uneven wave in the vicinity of its zero axis, filtering said gate-clipped wave to produce a constant continuous carrier wave, and demodulating the pulses by measuring the time displacements thereof with respect to the phase of said continuous carrier wave.

7. A system for deriving a continuous carrier frequency wave form, and demodulating, a pulsed time displacement modulated carrier to derive the signal carried by the time displacement pulses, wherein the pulses in their unmodulated state have a repetition rate subharmonically related to said carrier frequency comprising a gate clipper for said modulated carrier arranged to clip in the vicinity of the modulated carrier zero axis, means for applying the modulated carrier to said gate clipper, filter means coupled to the output of said gate clipper and filtering its clipped output to produce a continuous wave of uneven amplitude, a second gate clipper coupled to the output of said filter arranged to clip said continuous uneven wave in the vicinity of its zero axis, a second filter coupled to the output of said second gate clipper to produce said constant continuous wave, means to detect the pulses of said carrier, and means for demodulating said pulses by measuring the displacement thereof with respect to the phase of said constant continuous carrier wave.

EMILE LABIN.
DONALD D. GRIEG.

No references cited.